United States Patent
Sui et al.

(10) Patent No.: US 10,273,400 B2
(45) Date of Patent: Apr. 30, 2019

(54) COLLOIDAL SILICA AND POLYMER SYSTEM FOR INSULATING PACKER FLUIDS

(71) Applicant: M-I L.L.C., Houston, TX (US)

(72) Inventors: Changping Sui, The Woodlands, TX (US); Balakrishnan Panamarathupalayam, Houston, TX (US); Hui Joyce Zhang, Sugar Land, TX (US); William E. Foxenberg, Pearland, TX (US)

(73) Assignee: M-I L.L.C., Houston, TX (US)

( * ) Notice: Subject to any disclaimer, the term of this patent is extended or adjusted under 35 U.S.C. 154(b) by 591 days.

(21) Appl. No.: 14/648,509

(22) PCT Filed: Nov. 29, 2013

(86) PCT No.: PCT/US2013/072496
§ 371 (c)(1),
(2) Date: May 29, 2015

(87) PCT Pub. No.: WO2014/085770
PCT Pub. Date: Jun. 5, 2014

(65) Prior Publication Data
US 2015/0299558 A1      Oct. 22, 2015

Related U.S. Application Data

(60) Provisional application No. 61/731,141, filed on Nov. 29, 2012.

(51) Int. Cl.
*E21B 36/00* (2006.01)
*C09K 8/592* (2006.01)
*E21B 43/24* (2006.01)

(52) U.S. Cl.
CPC ............ *C09K 8/592* (2013.01); *E21B 36/003* (2013.01); *E21B 36/006* (2013.01); *E21B 43/24* (2013.01)

(58) Field of Classification Search
CPC ......... E21B 36/003; E21B 43/24; C08K 9/08; C08K 8/592; C08K 8/845
See application file for complete search history.

(56) References Cited

U.S. PATENT DOCUMENTS

| | | |
|---|---|---|
| 4,258,791 A | 3/1981 | Brandt et al. |
| 5,866,517 A | 2/1999 | Carpenter et al. |
| 6,586,372 B1 | 7/2003 | Bradbury et al. |

(Continued)

FOREIGN PATENT DOCUMENTS

WO     2009/023415 A2     2/2009

OTHER PUBLICATIONS

International Search Report and Written Opinion for the equivalent International patent application PCT/US2013/072496 dated Mar. 25, 2014.

(Continued)

*Primary Examiner* — Daniel P Stephenson
(74) *Attorney, Agent, or Firm* — David J. Smith

(57) ABSTRACT

Insulating packer fluids containing colloidal silica inorganic additives may be used in methods that reduce convective currents in a packer fluid. In other aspects, packer fluids containing colloidal silica inorganic additives may be used in methods of insulating production wells and methods for stimulating production of hydrocarbons.

20 Claims, 1 Drawing Sheet

(56) References Cited

U.S. PATENT DOCUMENTS

| | | | |
|---|---|---|---|
| 6,613,139 B1* | 9/2003 | Revis | C04B 14/06 |
| | | | 106/490 |
| 7,176,165 B2 | 2/2007 | Massam et al. | |
| 8,030,389 B2* | 10/2011 | Tej | C08K 3/346 |
| | | | 252/62 |
| 9,611,416 B2* | 4/2017 | Wang | C09K 8/12 |
| 2004/0127366 A1 | 7/2004 | Bradbury et al. | |
| 2005/0101493 A1 | 5/2005 | Bradbury et al. | |
| 2005/0131107 A1 | 6/2005 | Okel et al. | |
| 2005/0176852 A1 | 8/2005 | Okel et al. | |
| 2005/0263037 A1* | 12/2005 | Chatterji | C04B 20/1051 |
| | | | 106/677 |
| 2006/0188651 A1 | 8/2006 | Bradbury et al. | |
| 2006/0225615 A1 | 10/2006 | Raman et al. | |
| 2006/0228632 A1 | 10/2006 | Boyer et al. | |
| 2006/0281009 A1 | 12/2006 | Boyer et al. | |
| 2008/0064613 A1* | 3/2008 | Massam | C09K 8/03 |
| | | | 507/137 |
| 2008/0067468 A1 | 3/2008 | Pickens et al. | |
| 2010/0009874 A1 | 1/2010 | Ballard et al. | |
| 2010/0224366 A1* | 9/2010 | Lende | C04B 28/02 |
| | | | 166/292 |
| 2010/0292386 A1 | 11/2010 | Okel | |
| 2013/0324443 A1* | 12/2013 | Wang | C04B 24/163 |
| | | | 507/121 |
| 2015/0299558 A1* | 10/2015 | Sui | C09K 8/592 |
| | | | 166/302 |

OTHER PUBLICATIONS

International Preliminary Report on Patentability for the equivalent International patent application PCT/US2013/072496 dated Jun. 11, 2015.

* cited by examiner

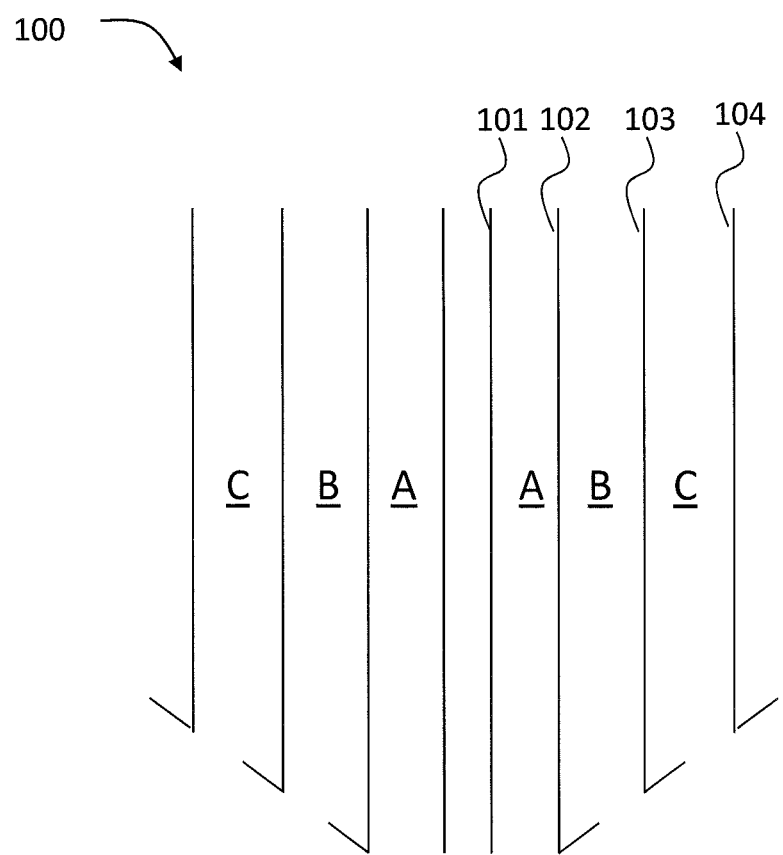

COLLOIDAL SILICA AND POLYMER SYSTEM FOR INSULATING PACKER FLUIDS

CROSS-REFERENCE TO RELATED APPLICATIONS

This application claims the priority under 35 U.S.C. § 119(e) to U.S. Provisional Application Ser. No. 61/731,141 filed Nov. 29, 2012, which is herein incorporated in its entirety.

BACKGROUND

Packer fluids or annular fluids are liquids which are pumped into annular openings such as, for example, (1) between a wellbore wall and one or more casing strings of pipe extending into a wellbore, or (2) between adjacent, concentric strings of pipe extending into a wellbore, or (3) in one or both of an A- or B-annulus in a wellbore comprising at least an A- and B-annulus with one or more inner strings of pipe extending into a said wellbore, which may be running in parallel or nominally in parallel with each other and may or may not be concentric or nominally concentric with the outer casing string, or (4) in one or more of an A-, B- or C-annulus in a wellbore comprising at least an A-, B- and C-annulus with one or more inner strings of pipe extending into a said wellbore, which may be running in parallel or nominally in parallel with each other and may or may not be concentric or nominally concentric with the outer casing string.

Yet alternatively, one or more strings of pipe may simply run through a conduit or outer pipe(s) to connect one or more wellbores to another wellbore or to lead from one or more wellbores to a centralized gathering or processing center; and packer fluids may have been emplaced within the conduits or pipes to form an insular barrier external to one or more strings of pipe therein.

Insulating packer fluids are wellbore fluids that serve to control heat loss—often through both conductive and convective mechanisms. These insulating packer fluids are especially necessary in oil or gas well construction operations conducted in low temperature venues of the world, for example, those areas having permafrost. Permafrost is a thick layer of frozen surface ground found often in arctic or Antarctic regions, which frozen ground may be several hundred feet thick and presents a great obstacle to the removal of relatively warm fluids through a well pipe penetrating said frozen ground. Particularly, warm fluid in the well pipe causes thawing of the permafrost in the vicinity of the well resulting in subsidence which can irreparably impair the permafrost environment and impose compressive and/or tension loads high enough to rupture or collapse the well casing and hence allow the escape of well fluids. In addition, the warm gas or oil coming to the surface in the well pipe becomes cooled by giving up its heat to the permafrost. Further, gas hydrate crystals may form, which can freeze together and block the well pipe; alternatively, wax or asphaltenes may form, which can agglomerate and block the well pipe. Generally, except for a tiny contribution from radiation, annular heat loss is due to convection and to conduction.

Conditions where the drill string are in contact with large bodies of water, such as deepwater operations, may also require thermal isolation of production fluids from the surrounding environment. Deepwater drilling is carried out under high bottom hole temperatures and pressures. The deepwater wells stretch to several thousand meters in depth, where the majority of the well string is in direct contact with ocean waters. Contact of the surrounding waters with the drill string may result in the rapid transfer of heat, leading to the formation of gas hydrates as described above.

Heavy oil production is another operation which often can benefit from the use of an insulating packer fluid. In heavy oil production, a high-pressure steam or hot water is injected into the well and the oil reservoir to heat the fluids in the reservoir, causing a thermal expansion of the crude oil, an increase in reservoir pressure and a decrease of the oil's viscosity. In this process, damage to the well casing may occur when heat is transferred through the annulus between the well tubing and the casing. The resulting thermal expansion of the casing can break the bond between the casing and the surrounding cement, causing leakage. Accordingly, an insulating medium such as a packer fluid may be used to insulate or to help insulate the well tubing. The packer fluid also reduces heat loss and saves on the energy requirements in stimulation using hot-water or steam (huff-n-puff) or in hot-water- or steam-flooding.

In addition to steam injection processes and operations which require production through a permafrost layer, subsea fields—especially, subsea fields in deep water, 1,500 to more than 6,000 feet deep—require specially designed systems, which may require an insulating annular or packer fluid. For example, a subsea oil reservoir temperature may be between about 120° F. and 250° F., while the temperature of the water through which the oil may be conveyed is often as low as 32° F. to 50° F. Conveying the high temperature oil through such a low temperature environment can result in oil temperature reduction and consequently the separation of the oils into various hydrocarbon fractions and the deposition of paraffins, waxes, asphaltenes, and gas hydrates. The agglomeration of these oil constituents can cause blocking or restriction of the wellbore, resulting in significant reduction or even catastrophic failure of the production operation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure are directed to methods of reducing convective currents in a packer fluid that may include pumping a packer fluid into one or more annuli of a wellbore created by two or more concentric strings of pipe extending into the wellbore, where packer fluid contains an aqueous base fluid, colloidal silica inorganic additive, and a polymeric viscosifier.

In another aspect, embodiments of the present disclosure are directed to methods for stimulating a well that include pumping the packer fluid into an annulus of a wellbore created by two or more concentric strings of pipe extending into the wellbore, where the packer fluid contains an aqueous base fluid, colloidal silica inorganic additive, and a polymeric viscosifier; and injecting hot water or steam through a pipe extending through the packer fluid while the packer fluid is static in the annulus between an interior and exterior temperature.

In yet another aspect, embodiments of the present disclosure are directed to methods of using an insulating packer fluid that include injecting an aqueous base fluid, a colloidal silica inorganic additive, and a polymeric viscosifier into an annulus created by two strings of pipe extending into the wellbore; holding the packer fluid static; and producing hydrocarbon fluids through the interior pipe.

Other aspects and advantages of the invention will be apparent from the following description and the appended claims.

BRIEF DESCRIPTION OF DRAWINGS

FIG. 1 shows a schematic of a completed wellbore according to one or more embodiments of the present disclosure.

DETAILED DESCRIPTION

Embodiments of the present disclosure relate to insulating packer fluids and methods of preparing and emplacing such fluids. Packer fluids are liquids which are pumped into and reside in an annular space between a casing and a tubing wall, between adjacent concentric strings of pipe extending into a wellbore (e.g., a tubing-casing annulus) or into the bore of a cased wellbore. In the completion of oil and gas wells, packer fluids may be placed into an annulus between a casing and a production tubing (i.e., tubing-casing annulus) and positioned above a packer, specifically where the packer has been set to isolate production fluid from the tubing-casing annulus. Packer fluids, introduced into the tubing-casing annulus, fill the annular column to surface. Packer fluids are used (1) to provide hydrostatic pressure in order to lower differential pressure across the sealing element, (2) to lower differential pressure on the wellbore and casing to prevent collapse and (3) to protect metals and elastomers from degradation.

During wellbore operations, a majority of annular heat loss is due to convection and conduction. Heat loss due to thermal conduction may be controlled by the selection of fluids having suitable thermal conductivity, while heat loss due to convection can be arrested or substantially diminished by increasing the low shear viscosity/yield stress of the selected fluid. Packer fluids according to the present disclosure may have good long-term insulation properties, because they may resist syneresis and phase separation of the various constituent components, have low thermal conductivities, and may possess unique rheological properties that minimize their movement once they are emplaced.

In one or more embodiments, insulating annular fluids of the present disclosure may form an insular barrier that controls heat transfer to or from surrounding tubing or casings through conduction and may also prevent heat transfer through convection by minimizing fluid movement initiated by temperature-dependent density changes. Packer fluids of the present disclosure may also exhibit stability under elevated temperatures that often degrade comparative packer fluids containing only polymeric viscosifiers. Moreover, packer fluids may be useful in oil or gas well construction operations conducted at lower temperature extremes, such as when operating in formations containing permafrost or arctic tundra.

In one or more embodiments, packer fluids may be emplaced in an annular region created between at least two concentric strings of pipe to insulate, for example, a drill string or production tubing. In some embodiments, once the packer fluid has been emplaced within the annular region it may be held static for a period of time depending on the particular application such as, for example, the duration of the drilling, production, or stimulation operation.

In a completed well 100, referring to FIG. 1 for ease of illustration, there may be several annuli. The 'A' annulus is the void between the production tubing 101 and the smallest casing string 102. The A annulus may serve a number of crucial tasks, including gas lift and well kills. Wells may also contain a 'B' annulus and a 'C' annulus, between the different casing strings, 102, 103, 104. These annuli do not normally have any connection to well bore fluids, but maintaining pressure in them is important in order to ensure integrity of the casing strings. In one or more embodiments, packer fluids of the present disclosure may emplaced or injected in one or more of these annuli to insulate an interior casing string or strings.

Depending on whether or not removal of a packer fluid from a given annulus is required, the packer fluid may be formulated to a higher density and/or viscosity. Moreover, while the A annulus is often reserved for less dense packer fluids that must remain pumpable in the event that a casing string within the annulus requires removal or replacement, outer annuli, such as B and C annuli, may contain packer fluids that are formulated such that they are not necessarily removable once emplaced and/or are stored long term in the outer annuli. Thus, in one or more embodiments, packer fluids may be prepared that are less stable and remain mobile for shorter periods of time. In these embodiments, the packer fluid may be formulated such that the colloidal silica and polymer within the fluid undergo a controlled setting reaction over a relatively long time span, e.g. one to several months.

Insulating packer fluids in accordance with the present disclosure may also be used in heavy oil production, where high-pressure steam or hot water is injected into a reservoir to heat trapped or poorly mobile hydrocarbon fluids, causing thermal expansion and an increase in reservoir pressure that leads to an increase in fluid mobility. For example, packer fluids formulated in accordance with the embodiments disclosed herein may be useful in extreme temperature applications such as wellbore stimulation that requires the injection of $CO_2$ at 400° F. into an oil-producing zone without significantly heating or damaging the surrounding formation. In one or more embodiments, stimulation of a well may be performed by preparing an insulating packer fluid, pumping the packer fluid into an annulus of a wellbore created by at least two concentric strings of pipe extending into the wellbore, and injecting hot water or steam through a pipe extending through the packer fluid.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

"Non-oleaginous liquid," or "aqueous" as used herein, means any substance that is a liquid at 25° C. and that is not an oleaginous liquid as defined below. Non-oleaginous liquids are immiscible with oleaginous liquids but capable of forming emulsions therewith. Non-oleaginous liquids may include fresh water, sea water, brine containing inorganic or organic dissolved salts, aqueous solutions containing water-miscible organic compounds and mixtures of these.

"Oleaginous liquid," as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids.

The term "alkyl" as used herein, unless otherwise specified, refers to a saturated straight chain, branched or cyclic hydrocarbon group of 1 to 24, or 1-12 in particular embodiments, carbon atoms, such as methyl, ethyl, n-propyl, isopropyl, n-butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl. The term "lower alkyl" intends an alkyl group of one to six carbon atoms, and includes, for example, methyl, ethyl, n-propyl, isopropyl, n-butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl. The term "cycloalkyl" refers to cyclic alkyl groups such as cyclopropyl, cyclobutyl, cyclopentyl, cyclohexyl, cycloheptyl and cyclooctyl.

Moreover, the term "alkyl" includes "modified alkyl", which references an alkyl group having from one to twenty-four carbon atoms, and further having additional groups, such as one or more linkages selected from ether-, thio-, amino-, phospho-, oxo-, ester-, and amido-, and/or being substituted with one or more additional groups including lower alkyl, aryl, alkoxy, thioalkyl, hydroxyl, amino, sulfonyl, thio, mercapto, imino, halo, cyano, nitro, nitroso, azide, carboxy, sulfide, sulfone, sulfoxy, phosphoryl, silyl, silyloxy, and boronyl. Similarly, the term "lower alkyl" includes "modified lower alkyl", which references a group having from one to eight carbon atoms and further having additional groups, such as one or more linkages selected from ether-, thio-, amino-, phospho-, keto-, ester-, and amido-, and/or being substituted with one or more groups including lower alkyl; aryl, alkoxy, thioalkyl, hydroxyl, amino, sulfonyl, thio, mercapto, imino, halo, cyano, nitro, nitroso, azide, carboxy, sulfide, sulfone, sulfoxy, phosphoryl, silyl, silyloxy, and boronyl. The term "alkoxy" as used herein refers to a substituent —O—R wherein R is alkyl as defined above. The term "lower alkoxy" refers to such a group wherein R is lower alkyl. The term "thioalkyl" as used herein refers to a substituent —S—R wherein R is alkyl as defined above.

The term "alkylene" as used herein, unless otherwise specified, refers to a bivalent saturated alkyl chain (such as ethylene) regarded as derived from an alkene by opening of the double bond or from an alkane by removal of two hydrogen atoms from different carbon atoms.

The term "alkenyl" or "alkene" as used herein, unless otherwise specified, refers to a branched, unbranched or cyclic (e.g. in the case of C5 and C6) hydrocarbon group of 2 to 30, or 2 to 12 in some embodiments, carbon atoms containing at least one double bond, such as ethenyl, vinyl, allyl, octenyl, decenyl, dodecenyl, and the like. The term "lower alkenyl" intends an alkenyl group of two to eight carbon atoms, and specifically includes vinyl and allyl. The term "cycloalkenyl" refers to cyclic alkenyl groups.

In certain aspects, disclosed embodiments relate to insulating packer fluids containing colloidal silica inorganic additives, and methods of emplacing and/or subsequently removing such fluids. Packer fluids according to embodiments disclosed herein may have relatively high densities, and may be adapted to survive in high temperature and/or high pressure wells. More specifically, insulating packer fluids in accordance with disclosed embodiments may contain an aqueous fluid, which may include fumed or precipitated silicas and clay additives, and may possess low thermal conductivity, increased viscosity, and high stability under elevated temperatures.

Colloidal Silica Inorganic Additives

Colloidal silica in accordance with embodiments of the present disclosure may be used as an inorganic additive that increases the low shear rheology and yield stress of wellbore fluids and, in some instances, may also act to modify the bulk viscosity and density of said wellbore fluids. In addition, the methods used to prepare silicas may affect the morphological characteristics of the final silica product and, in effect, the nature of rheological changes imparted by the addition of the silica to various wellbore fluids.

For example, fumed or pyrogenic silicas useful in embodiments disclosed herein are produced from the vapor phase hydrolysis of chlorosilanes, such as silicon tetrachloride, in a hydrogen oxygen flame are non-porous, water-soluble, have low bulk density, and possess high surface area. Due to the hydrogen bonding of the surface silanol groups present on the silica particles, fumed silicas may also impart unique rheological properties, such as increased viscosity and shear-thinning behavior, when added to aqueous and emulsion fluid systems.

Another form of silica useful in embodiments of the present disclosure as a viscosifying and/or weighting agent are precipitated silicas, such as those prepared from the reaction of an alkaline silicate solution with a mineral acid. Precipitated silicas may have a porous structure, and may behave a porous structure may be prepared from the reaction of an alkaline silicate solution with a mineral acid. Alkaline silicates may be selected, for example, from one or more of sodium silicate, potassium silicate, lithium silicate and quaternary ammonium silicates. Precipitated silicas may be produced by the destabilization and precipitation of silica from soluble silicates by the addition of a mineral acid and/or acidic gases. The reactants thus include an alkali metal silicate and a mineral acid, such as sulfuric acid, or an acidulating agent, such as carbon dioxide. Precipitation may be carried out under alkaline conditions, for example, by the addition of a mineral acid and an alkaline silicate solution to water with constant agitation. The properties of the silica particles may also be dependent, for example, on the choice of agitation, duration of precipitation, the addition rate of reactants, temperature, concentration, and pH.

Silicas useful in embodiments herein may include finely-divided particulate solid materials, such as powders, silts, or sands, as well as reinforced flocs or agglomerates of smaller particles of siliceous material. In one or more embodiments, silica particles (or agglomerates thereof) may have an average particle size ($d_{50}$) with a lower limit equal to or greater than 0.25 μm, 0.5 μm, 1 μm, 2 μm, 5 μm, 6 μm, and 8 μm to an upper limit of 5 μm, 10 μm, 15 μm, 20 μm, 40 μm, and 50 μm, where the $d_{50}$ of the silica particles may range from any lower limit to any upper limit. In some embodiments, silicas having a larger initial average particle size may be used, where shear or other conditions may result in comminution of the particles, such as breaking up of agglomerates, resulting in a silica particle having a useful average particle size. In yet other embodiments of the present disclosure, it is envisioned that mixtures a varying sizes of silicas may be added to various wellbore fluids.

Precipitated silicas may contain varying amounts of residual alkali metal salts that result from the association of the corresponding silicate counterion with available anions contributed by the acid source. Residual salts may have the basic formula MX, where M is a group 1 alkali metal selected from Li, Na, K, Cs, a group 2 metal selected from Mg, Ca, and Ba, or organic cations such as ammonium, tetraalkyl ammonium, imidazolium, alkyl imidazolium, and the like; and X is an anion selected from halides such as F, Cl, Br, I, and/or sulfates, sulfonates, phosphonates, perchlorates, borates, and nitrates. In embodiments, the residual salts may be selected from one or more of $Na_2SO_4$ and NaCl, and the precipitated silica may have a residual salt content (equivalent $Na_2SO_4$) of less than about 2 wt. %. While the pH of the resulting precipitated silicas may vary, embodiments of the silicas useful in embodiments disclosed herein may have a pH in the range from about 6.5 to about 9, such as in the range from about 6.8 to about 8.

In one or more embodiments of the present disclosure, the particle size of colloidal silica within solution may range from 9 to 100 nm. The colloidal silica sols are commercially available from Bayer Material Science, Grace Davison, Akzo Nobel, Nissan Chemical. Table 1 below lists the samples from those three companies.

TABLE 1

Colloidal silica with different particle sizes from different companies

| Sample | Company | Particle size (nm) |
|---|---|---|
| Dispercoll ™ S 3030 | Bayer Material Science | 9 narrow range |
| Dispercoll ™ S 5005 | Bayer Material Science | 55 narrow range |
| Ludox ® TM-50 | Grace Davison | 22 narrow range |
| Ludox ® PW-50 DE | Grace Davison | 50 (average of 10-90) |
| Cembinder ™ 8 | Akzo Nobel | 35 (average of 2-125) |
| Cembinder ™ N8 | Akzo Nobel | 35 narrow range |
| Cembinder ™ 19 | Akzo Nobel | 14 narrow range |
| Lavvasill ™ 30/50 | Akzo Nobel | 90 narrow range |

In other embodiments, surface-modified fumed and precipitated silicas may be used. The surface-modified silicas may include a lipophilic coating, for example. In some embodiments, the surface modification may be added to the silica after precipitation. Alternatively, the silica may be precipitated in the presence of one or more of the surface modification agents described below.

It has been found that surface-modified precipitated silicas according to embodiments herein may advantageously provide for both weighting and viscosifying of the aqueous base fluid. Fumed or precipitated silicas according to embodiments herein are useful for providing wellbore fluids having enhanced thermal stability in temperature extremes, while exhibiting a substantially constant rheological profile over time.

In some embodiments, the surface of the silica particles may be chemically modified by a number of synthetic techniques. Surface functionality of the particles may be tailored to improve solubility, dispersibility, or introduce reactive functional groups. This may be achieved by reacting the silica particles with organosilanes or siloxanes, wherein reactive silane groups present on the molecule may become covalently bound to the silica lattice that makes up the particles. Non-limiting examples of compounds that may be used to functionalize the surface of the silica particles include aminoalkylsilanes such as aminopropyltriethoxysilane, aminomethyltriethoxysilane, trimethoxy[3-(phenylamino)propyl]silane, and trimethyl[3-(triethoxysilyl)propyl]ammonium chloride; alkoxyorganomercapto silanes such as bis(3-(triethoxysilylpropyl)tetrasulfide, bis(3-(triethoxysilylpropyl)disulfide, vinyltrimethoxy silane, vinyltriethoxy silane, 3-mercaptopropyltrimethoxy silane; 3-mercaptopropyltriethoxy silane; 3-aminopropyltriethoxysilane and 3-aminopropyltrimethoxysilane; alkoxysilanes, diethyl dichlorosilane, phenyl ethyl diethoxy silane, methyl phenyl dichlorosilane, vinyl silane, 3,3,3-trifluoropropylmethyl dichlorosilane, trimethylbutoxy silane, sym-diphenyltetramethyl disiloxane, octamethyl trisiloxane, octamethyl cyclotetrasiloxane, hexamethyl disiloxane, pentamethyl dichlorosilane, trimethyl chlorosilane, trimethyl methoxysilane, trimethyl ethoxysilane, methyl trichlorosilane, methyl triethoxysilane, methyl trimethoxysilane, hexamethyl cyclotrisiloxane, hexamethyldisiloxane, gamma-methacryloxypropyl trimethoxy silane, hexaethyldisiloxane, dimethyl dichlorosilane, dimethyl dimethoxy silane, and dimethyl diethoxysilane.

In other embodiment, silicone polymers that contain reactive end groups may be covalently linked to the surface of the silica particles. Reactive silicone polymers may include, for example, bis-3-methacryloxy-2-hydroxypropyloxypropyl-polydimethylsiloxane, polydimethylsiloxanes comprising 3 to 200 dimethylsiloxy units, trimethyl siloxy or hydroxydimethylsiloxy end blocked poly(dimethylsiloxane) polymer, polysiloxanes, and mixtures thereof.

The surface-modified fumed or precipitated silicas may have a BET-5 nitrogen surface area of less than about 200 $m^2/g$. In some embodiments, the surface area of the surface-modified silica may be less than about 150 $m^2/g$. In other embodiments, the surface area may be in the range from about 20 $m^2/g$ to about 70 $m^2/g$ In one or more embodiments, the colloidal silica has a BET-5 nitrogen surface area of 50 $m^2/g$ to 270 $m^2/g$, as calculated from the surface adsorption of $N_2$ using the BET-1 point method, a pH in the range of pH 7.5 to pH 10, and an average particle diameter in the range of 3 nm to 100 nm.

In some embodiments, precipitated silicas useful in embodiments herein may include those as disclosed in U.S. Patent Application Publication Nos. 2010/0292386, 2008/0067468, 2005/0131107, 2005/0176852, 2006/0225615, 2006/0228632, and 2006/0281009, each of which is incorporated herein by reference.

In embodiments, a silica inorganic additive may be added to the wellbore fluids of the present disclosure at a percent by weight (wt %) concentration having a lower limit equal or greater than 0.5 wt %, 1 wt %, 5 wt %, and 10 wt % to an upper limit of 8 wt %, 10 wt %, 15 wt %, and 20 wt %, 30 wt %, where the wt % concentration of silica inorganic additive or combinations thereof may range from any lower limit to any upper limit.

In some embodiments, silica inorganic additives having two or more different average particle diameters may be incorporated in various relative percentages to balance the weighting and rheological properties of wellbore fluids in accordance with the present disclosure. It is also envisioned that combinations of fumed and precipitated silica particles having the same or different average particle sizes may be incorporated into wellbore fluid formulations in various relative percentages.

Polymeric Viscosifiers

In embodiments of the present disclosure, a polymeric viscosifier may be added to increase the viscosity of a wellbore fluid, improving the low end rheology of the fluid, decreasing the tendency of insoluble particles present in the fluid from "settling out." A variety of polymeric viscosifiers may be added to the drilling fluids disclosed herein that are generally selected from a group consisting of synthetic organic polymers, biopolymers, and mixtures thereof. In one or more embodiments, polymeric viscosifiers may be selected from polyanionic carboxymethylcellulose (PAC or CMC), polyacrylates, partially-hydrolyzed polyacrylamides (PHPA), lignosulfonates, xanthan gum, mixtures of these and the like. Polymeric viscosifiers may include, for example, POLYPAC® UL polyanionic cellulose (PAC), DUOVIS®, and BIOVIS®, each available from M-I L.L.C. (Houston, Tex.).

Depending on the application, the polymeric viscosifier may be a synthetic polymer that resists degradation over time, and in some instances, under high temperature/high pressure conditions (HTHP). Thermal and pressure stable polymeric viscosifiers polymers may include for example polymers, copolymers, block copolymers, and higher order copolymers (i.e., a terpolymer or quaternary polymer, etc.) composed of monomers that may include 2-acrylamido-2-methylpropanesulfonate, acrylamide, methacrylamide, N,N dimethyl acrylamide, N,N dimethyl methacrylamide, tetrafluoroethylene, dimethylaminopropyl methacrylamide, N-vinyl-2-pyrrolidone, N-vinyl-3-methyl-2-pyrrolidone, N-vinyl-4,4-diethyl-2-pyrrolidone, N-vinyl-5-isobutyl-2-pyrrolidone, N-vinyl-3-methyl-2-pyrrolidone, alkyl oxazoline, 2-ethyl-2-oxazoline, $C_1$-$C_{12}$ olefins, ethylene, propylene, butene, butadiene, vinyl aromatics, styrene, alkylstyrene, acrylic acid, methacrylic acid, vinyl alcohol, partially hydrolyzed acrylamide or methacrylamide, and derivatives or mixtures thereof. In yet other embodiments, polymeric viscosifiers may include polyalkylene amines and polyethers such as polyethylene oxide and polypropylene oxide.

In some embodiments, the polymeric viscosifiers may include, for example, thermally stable polymeric viscosifiers such as DUROTHERM™, DURALON™ available from MI, L.L.C. (Houston, Tex.), KEMSEAL™, available from Baker Hughes, Inc. (Houston, Tex.), DRISCAL®-D, available from Phillips Petroleum Co. (Bartlesville, Okla.), CYPAN™ available from National Oilwell Varco (Houston, Tex.), and ALCOMER™ 242, available from Allied Colloids Ltd (United Kingdom).

During preparation, crosslinking of a polymeric viscosifier can be induced or controlled by the choice of reaction initiator chemistry or by the deliberate incorporation of some monomer known to induce crosslinking, such as methylene-bis-acrylamide or divinylbenzene. For example, when polymeric viscosifiers in accordance with one or more embodiments of the present disclosure incorporate the monomer N-methyl-N-vinylacetamide and are subsequently crosslinked, wellbore fluids containing polymeric viscosifier may show desirable wellbore fluid performance characteristics under HTHP conditions. Random terpolymers consisting of 2-acrylamido-2-methylpropanesulfonate, N-methyl-N-vinylacetamide, and acrylamide are commercially available and may be used to impart desirable performance characteristics to a water-based mud under HTHP. In one or more embodiments of the present disclosure, useful crosslinked polymeric viscosifiers may be THERMA-CHEK™ available from Halliburton Energy Services, Inc., and HOSTADRILL® V2825, HOSTAMER V 4707™, HOSTAMER 4706™, and HOSTADRILL 2825™ are commercially available from the Clariant Corporation (Charlotte, N.C.).

In one or more embodiments, polymeric viscosifiers may be incorporated into wellbore fluids at a percent volume up to 5 vol %. In other embodiments, polymeric viscosifiers may be incorporated into wellbore fluids at 0.2 vol % to 5 vol %. In still other embodiments, the polymeric viscosifiers may be incorporated into wellbore fluids at 0.5 vol % to 1 vol %.

Thermal Stabilizers

For particular applications, such as operations conducted in arctic climates, it may be beneficial to add one or more thermal stabilizers to control the freezing point in order to optimize production from, or stimulation of, an oil-bearing reservoir. The addition of thermal stabilizers to packer fluids may also function to reduce the observed thermal conductivity, increasing the thermal insulation of the tubing from the surrounding environment.

Wellbore fluid formulations in accordance with embodiments disclosed herein may include one or more thermal stabilizers, which include trialkanolamines such as trimethanolamine, triethanolamine, triisopropanolamine, diethylaminopropanol, diethylethanolamine, dimethylamino-1-propanol, and the like.

In other embodiments, thermal stabilizers may include polyalcohols such as glycerol and alkylene glycols that include ethylene glycol, propylene glycol, polyethylene glycol, polypropylene glycol, and the like. For example, by adjusting the content of polyalcohols, the thermal conductivity of the fluid may be adjusted within the range of 0.18 to 0.35 BTU/(h*ft*° F.). Moreover, the addition of a glycol may lower the freezing point measurably. For example, the freezing point of a mixture of 60 vol % of ethylene glycol and 40 vol % of water is lower than −60° F.

In one or more embodiments, one or more thermal stabilizers may be added to the wellbore fluids of the present disclosure at a percent by volume (vol %) concentration having a lower limit equal or greater than 0.1 vol %, 0.5 vol %, 1 vol %, and 1.5 vol % to an upper limit of 1.5 vol %, 2 vol %, 2.5 vol %, where the vol % concentration of thermal stabilizers or combinations thereof may range from any lower limit to any upper limit. In other embodiments, one or more thermal stabilizers may be added at a concentration ranging from a lower limit equal to or greater than any of the above limits to an upper limit of 70%.

Additives

Additives that may be included in the wellbore fluids disclosed herein include, for example, corrosion inhibitors, biocides, pH buffers, mutual solvents, dispersants, thinning agents, rheological additives and cleaning agents. The addition of such agents should be well known to one of ordinary skill in the art of formulating drilling fluids and muds.

If necessary, the density of the fluid may be increased by incorporation of a solid weighting agent. Solid weighting agents used in some embodiments disclosed herein may include a variety of inorganic compounds well known to one of skill in the art. In some embodiments, the weighting agent may be selected from one or more of the materials including, for example, barium sulfate (barite), calcium carbonate (calcite or aragonite), dolomite, ilmenite, hematite or other iron ores, olivine, siderite, manganese oxide, and strontium sulphate. In a particular embodiment, calcium carbonate or another acid soluble solid weighting agent may be used.

The solid weighting agents may be of any particle size (and particle size distribution), but some embodiments may include weighting agents having a smaller particle size range than API grade weighing agents, which may generally be referred to as micronized weighting agents. Such weighting agents may generally be in the micron (or smaller) range, including submicron particles in the nanosized range.

In some embodiments, the average particle size ($d_{50}$) of the weighting agents may range from a lower limit of greater than 5 nm, 10 nm, 30 nm, 50 nm, 100 nm, 200 nm, 500 nm, 700 nm, 0.5 micron, 1 micron, 1.2 microns, 1.5 microns, 3 microns, 5 microns, or 7.5 microns to an upper limit of less than 500 nm, 700 microns, 1 micron, 3 microns, 5 microns, 10 microns, 15 microns, 20 microns, where the particles may range from any lower limit to any upper limit. The above described particle ranges may be achieved by grinding down the materials to the desired particle size or by precipitation of the material from a bottoms up assembly approach. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In some embodiments, the weighting agents may be uncoated. In other embodiments, the weighting agents may be coated with an organophilic coating such as a dispersant, including carboxylic acids of molecular weight of at least 150 Daltons, such as oleic acid, stearic acid, and polybasic fatty acids, alkylbenzene sulphonic acids, alkane sulphonic acids, linear alpha-olefin sulphonic acid, and alkaline earth metal salts thereof. Further examples of suitable dispersants may include a polymeric compound, such as a polyacrylate ester composed of at least one monomer selected from stearyl methacrylate, butylacrylate and acrylic acid monomers. The illustrative polymeric dispersant may have an average molecular weight from about 10,000 Daltons to about 200,000 Daltons and in another embodiment from about 17,000 Daltons to about 30,000 Daltons. One skilled in the art would recognize that other acrylate or other unsaturated carboxylic acid monomers (or esters thereof) may be used to achieve substantially the same results as disclosed herein.

In embodiments, the coated weighting agents may be formed by either a dry coating process or a wet coating process. Weighting agents suitable for use in other embodiments disclosed herein may include those disclosed in U.S. Patent Publication Nos. 2004/0127366, 2005/0101493, 2006/0188651, 2008/0064613, and U.S. Pat. Nos. 6,586,372 and 7,176,165, each of which is hereby incorporated by reference.

In one or more embodiments, surfactants such as wetting agents may be added to enhance the stability of suspensions or emulsions in wellbore fluids. Suitable wetting agents may include fatty acids, organic phosphate esters, modified imidazolines, amidoamines, alkyl aromatic sulfates, and sulfonates. For example, SUREWET®, which is commercially available from M-I LLC, Houston, Tex., is an oil based wetting agent and secondary emulsifier that may be used to wet fines and drill solids to prevent water-wetting of solids. Moreover, SUREWET® may improve thermal stability, rheological stability, filtration control, emulsion stability of wellbore fluids. Although various wetting agents have been listed above, testing has shown that not all surface-modified silicas work with all wetting agents, and may be due to compatibility of the surface modification and the wetting agent components. SUREWET®, for example, has been shown to be effective with polysiloxane, aminoalkylsilane, and alkoxyorganomercaptosilane coatings, whereas other wetting agents tested may not exhibit similar compatibility. Accordingly, when used, the wetting agent may be selected to provide a desired interaction with the surface-modified silica.

Wellbore Fluid Formulation

The silicas, organophilic clays, and optionally weighting agents as described above may be combined to form an aqueous fluid (water-based) wellbore fluid, as outlined below. In some embodiments, the materials may be combined to form an insulating packer fluids in accordance with embodiments herein.

In some embodiments, the wellbore fluids may include a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the wellbore fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

In one or more embodiments, wellbore fluids may be an emulsion containing a discontinuous oleaginous fluid phase dispersed within an aqueous base fluid. The oleaginous fluid may be a liquid, such as a natural or synthetic oil. For example, the oleaginous fluid may include one or more of diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids; similar compounds known to one of skill in the art; and mixtures thereof.

EXAMPLES

The following examples were used to test the stability and rheological properties of a insulating packer fluids in accordance with embodiments disclosed herein.

Example 1

An insulating packer fluid was formulated as shown in Table 2, where LUDOX®-TM-50 is a silica additive available from Grace Davison; and DRISCAL®-D is a polymeric viscosifier available from Phillips Petroleum Co. (Bartlesville, Okla.). The packer fluid had a final density of 10 ppg.

TABLE 2

| Packer fluid formulation for Example 1. | |
|---|---|
| LUDOX ® TM-50 | 0.5 bbl |
| DRISCAL ®-D | 6 ppb |
| triethanolamine | 0.035 bbl |
| water | 0.5 bbl |

The fluid formulation was prepared and placed in an oven at 250° F. and aged for various time intervals. Rheology measurements were taken at 120° C. for samples aged for 14, 21, 31, and 58 days and compared against a freshly prepared control. Results are shown in Table 3 below, where PV is plastic viscosity, YP yield point, and $\tau_o$ is the yield shear stress as predicted by the Herschel-Buckley rheological model. As illustrated in Table 3, the packer fluid formulation maintains a stable rheological profile following static aging for the specified period.

TABLE 3

Rheological data for packer fluid formulations in Example 1.

| Fann 35 @ 120° F. | Units | Control | 14 days | 21 days | 31 days | 58 days |
|---|---|---|---|---|---|---|
| 600 | lbs/100 ft² | 167 | 162 | 178 | 185 | 203 |
| 300 | lbs/100 ft² | 133 | 129 | 142 | 146 | 162 |
| 200 | lbs/100 ft² | 118 | 115 | 125 | 130 | 144 |
| 100 | lbs/100 ft² | 97 | 96 | 103 | 107 | 118 |
| 6 | lbs/100 ft² | 46 | 43 | 48 | 48 | 54 |
| 3 | lbs/100 ft² | 37 | 33 | 37 | 36 | 40 |
| PV | cP | 34 | 33 | 36 | 39 | 41 |
| YP | lbs/100 ft² | 99 | 96 | 106 | 107 | 121 |
| $\tau_o$ | lbs/100 ft² | 17.9 | 12.4 | 14.4 | 14.4 | 12.7 |

Example 2

A second packer fluid formulation was prepared in which the concentration of the polymer DRISCAL®-D was increased to 8 ppb. As shown in Table 4, the amount of polymer was increased to 8 ppb and all the rest components were kept the same as the previous formula in Table 2.

TABLE 4

Packer fluid formulation for Example 2.

| LUDOX ® TM-50 | 0.5 bbl |
|---|---|
| DRISCAL ®-D | 8 ppb |
| triethanolamine | 0.035 bbl |
| water | 0.5 bbl |

The rheology of a freshly prepared control was compared to sample formulations that were static aged at 250° F. Results are shown in Table 5, where PV is plastic viscosity, YP yield point, and $\tau_o$ is the yield shear stress as predicted by the Herschel-Buckley rheological model.

TABLE 5

Rheological data for packer fluid formulations in Example 2.

| Fann 35 @ 120° F. | Units | Control | 14 days | 21 days | 31 days | 60 days |
|---|---|---|---|---|---|---|
| 600 | lbs/100 ft² | 246 | 294 | 285 | 298 | 365 |
| 300 | lbs/100 ft² | 200 | 234 | 227 | 237 | 285 |
| 200 | lbs/100 ft² | 179 | 207 | 202 | 210 | 250 |
| 100 | lbs/100 ft² | 152 | 173 | 167 | 174 | 200 |
| 6 | lbs/100 ft² | 77 | 82 | 79 | 82 | 85 |
| 3 | lbs/100 ft² | 65 | 64 | 62 | 63 | 70 |
| PV | cP | 46 | 60 | 58 | 61 | 80 |
| YP | lbs/100 ft² | 154 | 174 | 169 | 176 | 205 |
| $\tau_o$ | lbs/100 ft² | 34.2 | 31.7 | 27.8 | 29.4 | 28.87 |

When compared to the 6 ppb polymer system of Example 1, $\tau_o$ for Example 2 is approximately doubled. It may also be observed that the high end rheology is also increased. After 60 days aging, the system possessed approximately the same rheological properties of a freshly prepared sample.

Example 3

A 10 ppg packer fluid formulation was prepared with 0.25 bbl/bbl CaCl₂ brine as shown in Table 6. It was found that the brine should be added after polymer, or precipitation of the silica colloid was observed. Rheological properties for sample fluid formulations were recorded at room temperature and 120° F. and are shown in Table 7, where PV is plastic viscosity, YP yield point, and $\tau_o$ is the yield shear stress as predicted by the Herschel-Buckley rheological model.

TABLE 6

Packer fluid formulation for Example 3.

| LUDOX ® TM-50 | 0.25 bbl |
|---|---|
| DRISCAL ®-D | 10 ppb |
| Triethanolamine | 0.035 bbl |
| 11.38 ppg CaCl₂ | 0.28 bbl/bbl |
| Water | 0.42 bbl/bbl |

A thick fluid with high $\tau_o$ in CaCl₂ developed. In addition, it was noted the high end rheology was sufficient to cause foreseeable issues with pumping formulations downhole.

TABLE 7

Rheological data for the packer fluid formulation of Example 3.

| Fann 35 RPM | Units | Room Temperature | 120° F. |
|---|---|---|---|
| 600 | lbs/100 ft² | 470 | 440 |
| 300 | lbs/100 ft² | 365 | 330 |
| 200 | lbs/100 ft² | 310 | 280 |
| 100 | lbs/100 ft² | 240 | 215 |
| 6 | lbs/100 ft² | 135 | 115 |
| 3 | lbs/100 ft² | 125 | 105 |
| PV | cP | 105 | 110 |
| YP | lbs/100 ft² | 260 | 220 |
| $\tau_o$ | lbs/100 ft² | 98.0 | 89.2 |

Example 4

A 10 ppg packer fluid formulation was prepared with 0.25 bbl/bbl CaCl₂ brine containing 8 ppg DRISCAL®-D as shown in Table 8. Rheological properties at room temperature and 120° F. were recorded for sample formulations and the results are shown in Table 9, where PV is plastic viscosity, YP yield point, and $\tau_o$ is the yield shear stress as predicted by the Herschel-Buckley rheological model.

TABLE 8

Packer fluid formulation for Example 4.

| LUDOX ® TM-50 | 0.25 bbl |
|---|---|
| DRISCAL ®-D | 8 ppb |
| Triethanolamine | 0.035 bbl |
| 11.38 ppg CaCl₂ | 0.30 bbl/bbl |
| Water | 0.45 bbl/bbl |

Sample packer fluid formulations possessed high end rheology that was reduced with respect packer formulations in Example 3. Formulations containing 8 ppb of polymeric viscosifier, gave better $\tau_o$ while still maintaining a reasonably high end rheology.

TABLE 9

Rheological data for the packer fluid formulation of Example 4.

| Fann 35 RPM | Units | Room Temperature | 120° F. |
|---|---|---|---|
| 600 | lbs/100 ft$^2$ | 23 | 205 |
| 300 | lbs/100 ft$^2$ | 178 | 263 |
| 200 | lbs/100 ft$^2$ | 150 | 132 |
| 100 | lbs/100 ft$^2$ | 117 | 106 |
| 6 | lbs/100 ft$^2$ | 81 | 53 |
| 3 | lbs/100 ft$^2$ | 73 | 50 |
| PV | cP | 52 | 42 |
| YP | lbs/100 ft$^2$ | 126 | 121 |
| $\tau_o$ | lbs/100 ft$^2$ | 70.1 | 24.4 |

Example 5

Packer fluid formulations containing 10 ppg NaCl brine were prepared to see the rheological behavior of the polymeric viscosifier/silica inorganic additive in alternative brines such as monovalent brines. Fluid formulations are listed in Table 9. Rheological properties at room temperature were recorded for a sample formulation and the results are shown in Table 10.

TABLE 9

Packer fluid formulation for Example 4.

| LUDOX ® TM-50 | 0.25 bbl |
|---|---|
| DRISCAL ®-D | 8 ppb |
| triethanolamine | 0.035 bbl |
| 10 ppg NaCl | 0.46 bbl |
| water | 0.25 bbl |

The packer fluid formulated with the monovalent NaCl brine exhibits less viscosity when compared to the previous formulations based on divalent calcium brines, which suggests that the silica weighting agent may interact ionically with charged groups on the polymer backbone, such as through ionic bridging or crosslinking, creating a notable increase in viscosity.

TABLE 10

Rheological data for the packer fluid formulation of Example 4.

| Fann 35 RPM | Units | Room Temperature |
|---|---|---|
| 600 | lbs/100 ft$^2$ | 23 |
| 300 | lbs/100 ft$^2$ | 178 |
| 200 | lbs/100 ft$^2$ | 150 |
| 100 | lbs/100 ft$^2$ | 117 |
| 6 | lbs/100 ft$^2$ | 81 |
| 3 | lbs/100 ft$^2$ | 73 |
| PV | cP | 52 |
| YP | lbs/100 ft$^2$ | 126 |
| $\tau_o$ | lbs/100 ft$^2$ | 70.1 |

While the use of silica is well known in aqueous-based wellbore fluids, it has been found that precipitated silicas also have a measurable impact on the observed viscosity when added to oil-based wellbore fluids, and those having ordinary skill in the art will appreciate that embodiments disclosed herein may be useful in any application where packer fluids may be used.

Advantageously, packer fluids formulated in accordance with the present disclosure can be used as an insulating packer fluid for temperatures up to 525° F. or greater, providing a constant rheological profile even with prolonged heat aging and under high shear conditions. Thus, materials disclosed herein have significant advantages over insulating packer fluids that utilize organic compounds or polymers, which degrade at such extreme conditions and temperatures. In addition, because the rheological profile of the fluids do not change appreciably with high heat or shear, the fluids may also be recaptured and reused for subsequent applications.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. Moreover, embodiments disclosed herein may be practiced in the absence of any element which is not specifically disclosed.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of reducing convective currents in a packer fluid, the method comprising:
   pumping a packer fluid into an annulus of a wellbore created by two concentric strings of pipe extending into the wellbore, wherein the packer fluid comprises:
   an aqueous base fluid,
   a colloidal silica inorganic additive,
   a thermal stabilizer selected from a group consisting of trimethanolamine, triethanolamine, triisopropanolamine, diethylaminopropanol, diethyl ethanolamine and dimethylamino-1-propanol, and
   a polymeric viscosifier.

2. The method of claim 1, wherein polymeric viscosifier is a polymer, copolymer, or higher order copolymer containing one or more monomers selected from a group consisting of 2-acrylamido-2-methylpropanesulfonate, acrylamide, methacrylamide, N,N dimethyl acrylamide, N,N dimethyl methacrylamide, dimethylaminopropyl methacrylamide, N-vinyl-2-pyrrolidone, N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, alkyl oxazoline, and 2-ethyl-2-oxazoline.

3. The method of claim 2, wherein the polymeric viscosifier is a terpolymer of 2-acrylamido-2-methylpropanesulfonate, acrylamide, and 2-vinylpryrrolidone.

4. The method of claim 1, wherein the colloidal silica inorganic additive is present in the packer fluid in a concentration ranging from about 5 wt % to about 30 wt %.

5. The method of claim 1, wherein the colloidal silica is a surface-modified colloidal silica comprising a lipophilic coating.

6. The method of claim 5, wherein the lipophilic coating comprises at least one of a polysiloxane, an aminoalkylsilane, and an alkoxyorganomercaptosilane.

7. A method for stimulating a well, comprising
pumping a packer fluid into an annulus a wellbore created by two concentric strings of pipe extending into the wellbore, wherein the packer fluid comprises:
   an aqueous base fluid,
   a colloidal silica inorganic additive,
   a thermal stabilizer selected from a group consisting of trimethanolamine, triethanolamine, triisopropanolamine, diethylaminopropanol, diethyl ethanolamine and dimethylamino-1-propanol, and
   a polymeric viscosifier; and
injecting hot water or steam through an interior pipe of the two concentric strings of pipe.

8. The method of claim 7, wherein the aqueous base fluid further comprises an internal oleaginous phase, wherein the internal oleaginous phase is one or more selected from a group consisting of diesel oil, a mixture of diesel and paraffin oil, mineral oil, and isomerized olefins.

9. The method of claim 7, wherein the $d_{50}$ particle diameter of the colloidal silica inorganic additive ranges from 9 nm to 100 nm.

10. The method of claim 7, wherein the colloidal silica is a surface-modified colloidal silica comprising a lipophilic coating.

11. The method of claim 10, wherein the lipophilic coating comprises at least one of a polysiloxane, an aminoalkylsilane, and an alkoxyorganomercaptosilane.

12. The method of claim 7, wherein polymeric viscosifier is a polymer, copolymer, or higher order copolymer containing one or more monomers selected from a group consisting of 2-acrylamido-2-methylpropanesulfonate, acrylamide, methacrylamide, N,N dimethyl acrylamide, N,N dimethyl methacrylamide, dimethylaminopropyl methacrylamide, N-vinyl-2-pyrrolidone, N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, alkyl oxazoline, and 2-ethyl-2-oxazoline.

13. The method of claim 7, wherein the polymeric viscosifier is a terpolymer of 2-acrylamido-2-methylpropanesulfonate, acrylamide, and 2-vinylpryrrolidone.

14. An insulating packer fluid, comprising:
   an aqueous base fluid,
   a colloidal silica inorganic additive,
   a thermal stabilizer selected from a group consisting of trimethanolamine, triethanolamine, triisopropanolamine, diethylaminopropanol, diethyl ethanolamine and dimethylamino-1-propanol, and
   a polymeric viscosifier.

15. The fluid of claim 14, wherein the colloidal silica inorganic additive comprises a surface-modified silica.

16. The fluid of claim 15, wherein the surface-modified silica comprises at least one of a polysiloxane, an aminoalkylsilane, and an alkoxyorganomercaptosilane.

17. The fluid of claim 14, wherein the colloidal silica inorganic additive is present in the packer fluid in a concentration ranging from about 5 wt % to about 30 wt %.

18. The fluid of claim 14, wherein polymeric viscosifier is a polymer, copolymer, block copolymer, or higher order copolymer containing one or more monomers selected from a group consisting of 2-acrylamido-2-methylpropanesulfonate, acrylamide, methacrylamide, N,N dimethyl acrylamide, N,N dimethyl methacrylamide, dimethylaminopropyl methacrylamide, N-vinyl-2-pyrrolidone, N-vinyl-3-methyl-2-pyrrolidone, N-vinyl-4,4-diethyl-2-pyrrolidone, 5-isobutyl-2-pyrrolidone, N-vinyl-3-methyl-2-pyrrolidone, alkyl oxazoline, and poly(2-ethyl-2-oxazoline).

19. The fluid of claim 18, wherein the polymeric viscosifier is a terpolymer of 2-acrylamido-2-methylpropanesulfonate, acrylamide, and 2-vinylpryrrolidone.

20. The fluid of claim 14, further comprising a micronized weighting agent.

* * * * *